Patented Feb. 15, 1927.

1,617,343

UNITED STATES PATENT OFFICE.

WILLIAM W. ODELL, OF MINNEAPOLIS, MINNESOTA.

SWEEPING AND DUST-SETTLING COMPOUND.

No Drawing. Application filed March 28, 1925. Serial No. 19,175.

The objects of my invention are: to produce a sweeping compound for use in sweeping and cleaning floors as an absorbent and as a means for preventing the scattering of dust; to utilize cheap materials which are available in large quantities and which, so far as I am aware, have not been used heretofore in such compounds; to utilize the known properties of materials with respect to preferential surface wetting phenomena in the selection of fillers; to utilize a filler which is also an absorbent, in a sweeping compound; and to utilize the adsorption properties of peat in making the compound a deodorizing agent as well as a sweeping compound.

My composition may consist of a mixture of wet pulp-peat, a finely divided filler such as sand, crushed limestone, crushed coke, coke breeze, crushed oil shale or the like, and an oil.

Heretofore it has been common practice to use saw dust as a base in making such compounds and the former can only be obtained, in certain parts of the country, by cutting wood especially for the purpose; this practice is wasteful of natural resources, unnecessary and expensive. Furthermore saw dust is usually wetted with water before mixing with the other ingredients in order to increase the weight and to decrease thereby the percentage of oil required in the finished product. Peat usually does not require extra wetting unless it has been previously dried. One purpose of the oil used in the manufacture of sweeping compounds is to retard the rate of evaporation of the water, which latter saw dust does not readily retain. Peat has the inherent property of retaining moisture, particularly en masse; when made into a sweeping compound it retains moisture tenaciously. Less oil is required to retain a given amount of moisture in a unit weight of compound made from peat as a base than in the same weight of compound made from saw dust.

By the use of peat in place of saw dust or in part in place of saw dust, I find that I can not only increase the water-carrying capacity of a sweeping compound but also increase the power to retain the water in the finished compound.

It is recognized that saw dust, when wet, will absorb and retain dust when used as a sweeping compound, but it can not be successfully marketed in this form because, upon exposure to the atmosphere, at room temperatures, the moisture readily evaporates. The oil which is usually added has therefore a two-fold purpose, namely, to retard the rate of evaporation of the water absorbed in the compound—in the saw dust or other base—and to absorb dust particles. Peat is a natural absorbent and has the property of absorbing and adsorbing gaseous materials as well as liquids, hence when used in a sweeping compound it gives the latter the added property of being a deodorant. In many sweeping compounds on the market at the present time, other materials are added for this purpose which are essentially odoriferous materials and which merely "cover up" the foul odor they are supposed to destroy.

The peat I prefer to use in making my sweeping compound is a fairly well matured peat fresh from a well drained bog, although I do not confine my claims to this particular kind of peat. I find that many varieties of peat can be used in a similar manner by properly shredding, drying and shredding, crushing and drying, or by some similar process and ultimately bringing the water content to a desired percentage. Air dried peat, which usually contains ten to twenty per cent of moisture, is a suitable substitute for saw dust and can be used in a like manner as saw dust when properly sized by either crushing, shredding or otherwise preparing it.

The percentage of peat most desired in a sweeping compound varies with the character of the peat, the kind and character of the oil used, the kind, shape and size of the filler used, the surface wetting properties of the filler used and with the density requirements specified for the finished compound. Accordingly I prefer not to limit myself to the use of a definite percentage of peat. However an example formulæ for a sweeping compound suitable for general use is as follows:

| | Per cent by weight. |
|---|---|
| Peat, containing approximately 60 to 70% of moisture and of suitable size but not containing long fibres | 51.0 |
| Filler, fine clean sand or other filler | 40.0 |
| Oil, neutral oil or other mineral oil | 9.0 |
| | 100.0 |

The oil may be added to the peat by spraying or atomizing and the sand added after the oil is thoroughly mixed into and distributed over the surface of the peat particles, or the sand may be added to and mixed with the peat prior to the addition of the oil.

The sand or other filler used, which may be a suitably ground quartz, crushed rock, crushed limestone, shale, coke, coke-breeze, or other similar material, is used for the purpose of controlling the apparent density of the finished product. Usually a sweeping compound must be of such a density that it can be thrown from the hand or from a suitable spreader over an appreciable area of floor space, and it is found that less effort is required to throw a definite amount of compound a given distance when a mineral filler or dense filler is used than when it is not used. Sometimes a filler is required which will "hold" to the floor, and in such cases the very fine sand composed of substantially spherical particles is not so desirable as a coarse sharp sand. Normally the former sand is preferable.

The percentage of filler used is also dependent upon the phenomenon of preferential surface wetting; when the filler used has the property of being preferentially wetted by oil rather than by water in the presence of both oil and water, a larger percentage of filler may be used without detracting from the usefulness of the compound, than when other fillers are used. If an oil-wetted filler is particularly low in density then a still greater percentage of it can be used. Certain shales, shale sands, coke, partly carbonized carbonaceous materials and the like are preferentially wetted by oil instead of water in the presence of both. I believe that the selection of fillers for a sweeping compound has not hitherto been made according to surface wetting properties. It will be noted that when the filler selected is preferentially wetted by oil in the presence of water, it can not in a true sense, be called a filler, although this term is used in this application to designate sand, mineral matter generally, coke, carbonaceous solid matter other than peat and saw dust, and similar materials.

The oil used may be a mineral oil which will not volatilize rapidly at normal room temperatures. Mixtures of "neutral paraffin oil" and fuel oil have proven satisfactory. It should be noted that when peat is used as the base instead of saw dust, oils may be used which because of their odor could not be used with the latter absorbent. This is true because of the absorbent and adsorbent properties of peat. Any kind of oil may be used, vegetable or mineral, but because mineral oils are always so much cheaper and do not become rancid they are preferred to the vegetable oils.

When crushed coke is used in place of sand as the filler, or to replace a part of the sand a larger relative volume of it can be used and also a larger percentage by weight. A larger percentage by weight can be used because of the lower apparent specific gravity of the coke; a larger percentage by volume can be used because the coke has the property of being preferentially wetted by oil in the presence of moisture and is not therefore a filler only, in a true sense, but is also an oil-carrying agent. When oil is cheap, when sand is expensive, when coke is cheap, or when the compound is sold by volume there is an obvious advantage in employing crushed coke in place of sand, or in place of a part of the sand, in a sweeping compound. When used with or without sand the coke lends a silvery appearance to the sweeping compound.

I find that when peat is the vegetable absorbent used in making a sweeping compound there is less sticking of the latter to the broom or brush used than when saw dust is the absorbent, although the reason for this is not clear.

It is recognized that if a solid does not adsorb a particular liquid it will not be wetted by that liquid. Sand, quartz etc. are wetted by water, whereas oil shale, coal, coke, and other carbonaceous materials are wetted by oil.

I claim:

1. A prepared sweeping compound consisting of an absorbent material including wet peat, a filler and an oil, used to allay the scattering of dust during the sweeping of floors.

2. A sweeping compound adapted to allay the scattering of dust during the sweeping of floors, comprising, substantially, wet peat as a base and absorbent, oil as a surface coating medium, and a filler, the whole being thoroughly mixed.

3. A sweeping compound adapted to allay the scattering of dust during the sweeping of floors when spread upon said floors prior to the sweeping thereof, comprising, substantially, wet peat as a base and absorbent, an oil as a coating medium, and a filler, said filler comprised of particles substantially the size of sand particles; the whole being thoroughly mixed.

4. A sweeping compound adapted to allay the scattering of dust during the sweeping of floors, when suitably spread upon said floors prior to the sweeping thereof, comprising substantially, a vegetable absorbent including wet peat, a filler, and an oil, the whole being thoroughly mixed; said filler having the physical property of being preferentially wetted by oil rather than by water.

5. A sweeping compound adapted to allay the scattering of dust during the sweeping of floors, when suitably spread upon said floors prior to the sweeping thereof, comprising substantially, a vegetable absorbent containing moisture, a filler, and an oil, the whole being thoroughly mixed; said absorbent consisting in at least twenty-five per cent of wet peat by volume, and said filler consisting in at least twenty-five per cent by volume of particles of material having the physical property of being preferentially wetted by oil rather than by water.

6. A sweeping compound adapted to allay the scattering of dust during the sweeping of floors, when suitably spread upon said floors prior to the sweeping thereof, comprising, peat containing more than twenty per cent of moisture, a filler having the property of being preferentially wetted by oil rather than by water, and an oil, the whole being thoroughly mixed.

7. A sweeping compound adapted to allay the scattering of dust during the sweeping of floors, when suitably spread upon said floors prior to the sweeping thereof, consisting of, substantially, a wet vegetable absorbent containing wet peat, a granular silicious material of which sand is an example, an oil and mineral matter having the property of being preferentially wetted by oil in the presence of water as an oil carrying medium, the whole being thoroughly mixed.

8. A sweeping compound comprising crushed oil shale, an oil and wet peat, the whole being thoroughly mixed.

9. A sweeping compound adapted to allay the scattering of dust during the sweeping of floors, when suitably spread upon said floors prior to the sweeping thereof, consisting of, crushed oil-shale, a wet vegetable absorbent including wet peat and an oil, the whole being thoroughly mixed.

10. A sweeping compound adapted to allay the scattering of dust during the sweeping of floors, when suitably spread upon said floors prior to the sweeping thereof, consisting of a vegetable absorbent containing wet peat, a filler containing crushed oil-shale and an oil, the whole being thoroughly mixed.

WILLIAM W. ODELL.